(No Model.)
W. H. McCULLERS.
COMBINED CULTIVATOR AND HARROW.
No. 467,863. Patented Jan. 26, 1892.
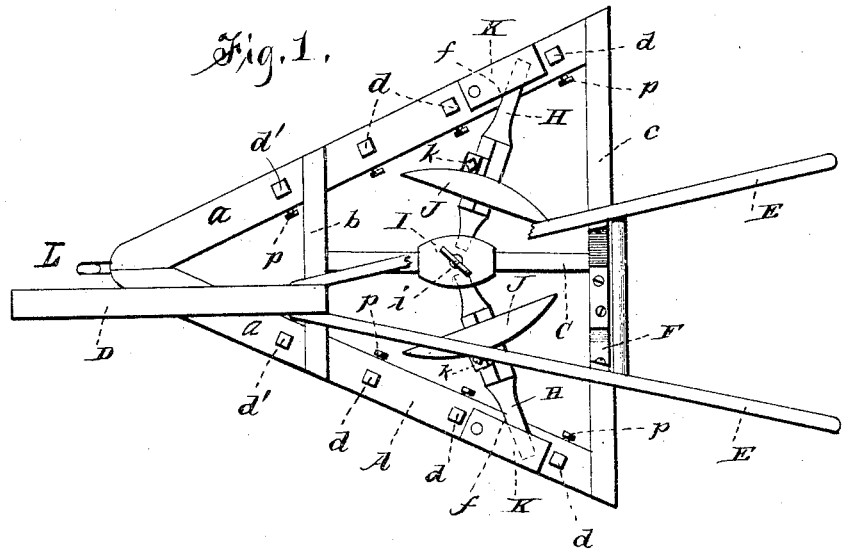
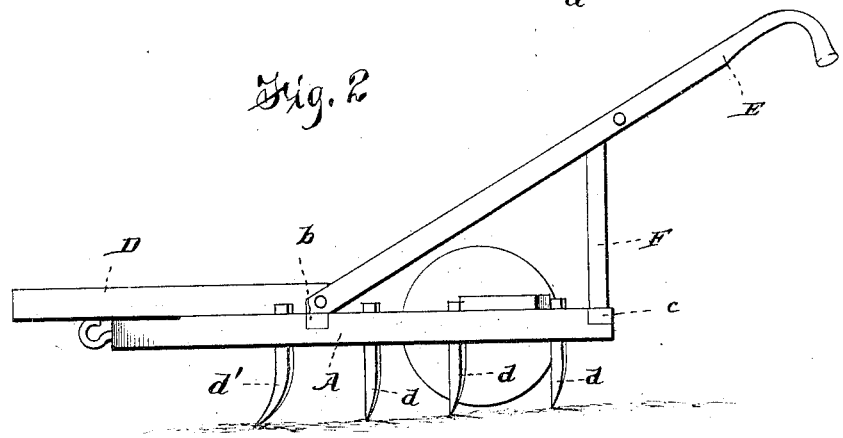
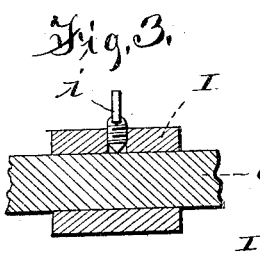
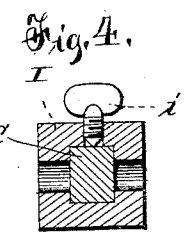
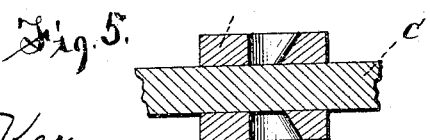
Witnesses
Samuel Ker
Philip E. Masi
Inventor
W. H. McCullers,
by E. W. Anderson
his Attorney

UNITED STATES PATENT OFFICE.

WILL H. McCULLERS, OF CLAYTON, NORTH CAROLINA.

COMBINED CULTIVATOR AND HARROW.

SPECIFICATION forming part of Letters Patent No. 467,863, dated January 26, 1892.

Application filed August 6, 1891. Serial No. 401,918. (No model.)

*To all whom it may concern:*

Be it known that I, WILL H. McCULLERS, a citizen of the United States, and a resident of Clayton, in the county of Johnston and State of North Carolina, have invented certain new and useful Improvements in a Combined Cultivator and Harrow; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a top plan view. Fig. 2 is a side view. Figs. 3, 4, and 5 are sectional detail views.

This invention has relation to certain improvements in combined cultivators and harrows; and it consists in the novel construction and combination of parts, as hereinafter specified.

In the accompanying drawings, illustrating the invention, the letter A designates a triangular frame, the converging side bars $a$ $a$ of which are connected by the transverse bars $b$ and $c$.

C is a central longitudinal bar connecting the transverse bars $b$ and $c$.

D is the draft-bar secured to one side of the center, the cultivator being what is known as a "straddle-row."

E E are the handles, secured at their forward ends to either side of the draft-bar or to the bar $c$ and supported by the brace F.

In each side bar $a$ of the frame are a series of harrow-teeth $d$, which gradually diminish in length from front to rear, the front tooth $d'$ on either side being bent or curved forwardly to present a raking-point.

Near the rear end of each side bar $a$ is provided a bearing $f$, in which is journaled one end of a shaft H, the opposite end having bearings in a block I, loosely mounted in the central longitudinal bar C of the frame.

On each shaft is a disk J, having a smooth inner face and a convex outer surface. This block is made adjustable longitudinally on said bar by a set-screw $i$, thereby providing for the lateral adjustment of the disks J, the shafts having loose bearings for this purpose.

The position of the shafts is such that the rear portions of the said disks are inclined toward each other, as shown, in order to carry or set the soil toward the plants on either side, and by varying the adjustment thereof the soil may be set more or less toward the plants, as may be desired. Each disk is also made independently adjustable upon its shaft by a set-screw $k$ or other suitable device. The shafts are held in the bearings $f$ by the pivoted pieces or caps K, and by turning these to one side the said shafts and disks may be entirely removed from the frame and the device used as an ordinary harrow.

On the forward end of the frame is a small hook L, to which one trace may be secured when it is desired to use two of the machines with one animal, the other trace being secured to a similar hook on the other machine. The harrow-teeth may be made adjustable by means of the set-screws $p$, as shown.

Having thus described the invention, what I claim, and desire to secure by Letters Patent, is—

1. In a cultivator, the disks arranged one on either side of the center and carried by shafts having bearings at one end in the side pieces of the frame and at their other ends in an adjustable block, said shafts being removable from their bearings and said disks independently adjustable on the shafts, substantially as specified.

2. A combined cultivator and harrow comprising the V-shaped frame, the side pieces of which carry harrow-teeth, the transverse frame-bars $b$ and $c$, the central longitudinal bar C, connecting said transverse bars, and disks arranged one on either side of the center and carried by shafts or axles having bearings at one end in the side pieces of the frame and at the other end in a bearing-block adjustable on said center bar, and means for effecting the independent adjustment of each disk on its shaft, substantially as specified.

In testimony whereof I affix my signature in presence of two witnesses.

WILL H. McCULLERS.

Witnesses:
PHILIP C. MASI,
M. P. CALLAN.